United States Patent
Gringauz et al.

(10) Patent No.: US 6,845,143 B2
(45) Date of Patent: Jan. 18, 2005

(54) CT IMAGE RECONSTRUCTION

(75) Inventors: Asher Gringauz, Nesher (IL); Yoav Bar, Haifa (IL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/475,404

(22) PCT Filed: May 20, 2001

(86) PCT No.: PCT/IL01/00450
§ 371 (c)(1),
(2), (4) Date: Mar. 29, 2004

(87) PCT Pub. No.: WO02/086822
PCT Pub. Date: Oct. 31, 2002

(65) Prior Publication Data
US 2004/0146136 A1 Jul. 29, 2004

(30) Foreign Application Priority Data
Apr. 23, 2001 (WO) .............................. PCT/IL01/00375

(51) Int. Cl.[7] .............................................. A61B 6/03
(52) U.S. Cl. ................................ 378/8; 378/4; 378/901
(58) Field of Search ........................... 378/4, 8, 15, 19, 378/901

(56) References Cited

U.S. PATENT DOCUMENTS

| | | | | |
|---|---|---|---|---|
| 6,084,936 A | * | 7/2000 | Patch | 378/4 |
| 6,173,030 B1 | * | 1/2001 | Patch | 378/4 |
| 6,240,157 B1 | * | 5/2001 | Danielsson | 378/15 |

* cited by examiner

*Primary Examiner*—David V Bruce
(74) *Attorney, Agent, or Firm*—John J. Fry

(57) ABSTRACT

A method for artifact reduction in CT images comprising reconstructing a first data image using an inexact reconstruction algorithm, segmenting the first data image to provide a second image with high attenuation objects separate from low attenuation objects, reprojecting the second image to form a second set of data, reconstructing a third image from the second data set using an inexact reconstruction algorithm; and subtracting at least those portions of the third image outside the high attenuation object from the first image.

12 Claims, 2 Drawing Sheets

CT IMAGE RECONSTRUCTION

FIELD OF THE INVENTION

The present invention relates to improving the quality of cone beam CT X-ray images containing high attenuation objects, and in reducing the artifacts caused by such objects.

BACKGROUND OF THE INVENTION

Computer Tomography (CT) X-ray data is computationally compiled from absorption data of X-rays that pass through an object and reconstructed into an image. An image with low attenuation regions such as soft biologic tissue can contain artifacts generated by high attenuation objects. Artifacts degrade the quality of the CT image, obstruct identification and/or diagnosis and should be removed to give an accurate image. Artifact reduction is sometimes accomplished through reprojection and reconstruction of the image using a number of mathematical systems.

Some systems make computations on all scan data, reconstructing the image pixel-by-pixel. Typically, these methods require many iterative steps and are computationally complex and slow. Such a method is disclosed in U.S. Pat. No. 5,243,664 to Tuy.

Other methods are less computationally complex, but discard high attenuation objects along with the artifacts so they may be missing important high attenuation parts of the image. An example of this system is seen in U.S. Pat. No. 4,590,558 to Glover et al.

U.S. Pat. No, 4,709,333 to Crawford, describes a similar method where two high attenuation objects shadow each and both objects and their artifacts are removed from the image.

Other systems reduce artifacts using interpolation of the two-dimensional Fourier transform of the image and reprojection, as seen in U.S. Pat. No. 4,616,318 to Crawford.

U.S. Pat. No. 4,626,991 to Crawford uses multiple reprojections sent to a backprojector and then combines the data with the original projections to correct for "polychromatic aberrations" in a non-cone beam CT X-ray scanner.

U.S. Pat. No. 4,714,997 to Crawford describes a method for shortening image processing time by reducing the reprojection data used in reconstructing the image.

U.S. Pat. No. 6,094,467, to Gayer et al. describes a method that reduces the complexity of the algorithmic functions by determining the extents of the high attenuation objects.

SUMMARY OF THE INVENTION

An aspect of some embodiments of the present invention relates to reducing artifacts in a CT image reconstructed from an inconsistent data set. In one example, the inconsistent data set is generated by an X-ray cone beam.

In an exemplary embodiment of the present invention artifacts are recreated by reprojecting and reconstructing high attenuation objects from a CT image generated from an inconsistent CT data set. The recreated artifacts are subtracted from low attenuation regions of a reconstructed CT X-ray data, yielding an image with reduced artifacts.

In an exemplary embodiment of the present invention, the reprojection of high attenuation objects simulates the real direction of at least one of the beams of the X-ray through the scanned volume image.

Generally, any algorithms known in the art that are appropriate for reconstructing images from an inconsistent data set can be used in the present invention.

In an exemplary embodiment of the present invention, the reconstruction of the high attenuation objects results in an approximation of high attenuation objects and artifacts contained in the original data set.

Although the data is converted into an approximation of artifacts used in the subtraction process above, the resultant reconstructed CT image maintains good clarity with reduced artifacts.

There is thus provided, in accordance with an exemplary embodiment of the invention a method for artifact reduction in CT images comprising:

providing at least one first set of CT data;

reconstructing at least one first data image using an inexact reconstruction algorithm;

segmenting the at least one first data image to provide at least a second image with high attenuation objects separate from low attenuation objects;

reprojecting the second image to form at least one second set of data;

reconstructing a third image from the second data set using an inexact reconstruction algorithm; and subtracting at least those portions of the third image outside the high attenuation object from the first image.

In an embodiment of the invention, the at least one first set of CT data is inconsistent. Alternatively, the at least one first set of CT data is consistent. Alternatively, the at least one first set of CT data is produced by a cone beam X-ray unit.

In an embodiment of the invention, reconstruction of the one first data image comprises utilizing an inexact reconstruction algorithm compatible with cone beam X-ray data.

In an embodiment of the invention, segmenting the at least one first data image comprises segmenting to provide at least a second image with high attenuation objects.

In an embodiment of the invention, the second image is reprojected to form at least one second set of consistent data. Alternatively, the second image is reprojected to form at least one second set of inconsistent data.

In an embodiment of the invention, reprojecting the second image to form at least one second set of data comprises reprojecting along the directions of the original X-rays through the object.

In an embodiment of the invention, reconstructing a third image from the second data set comprises utilizing an inexact reconstruction algorithm used in reconstruction of data. Alternatively, reconstructing a third image from the second data set comprises utilizing an inexact reconstruction algorithm compatible with cone beam X-ray data.

In an embodiment of the invention subtracting at least those portions comprises subtracting only those portions corresponding to the low attenuation areas of the first image.

BRIEF DESCRIPTION OF THE DRAWINGS

The following detailed description of exemplary non-limiting embodiments of the invention should be read together with the following drawings in which.

DETAILED DESCRIPTION OF EXEMPLARY EMBODIMENTS

Figure 1:
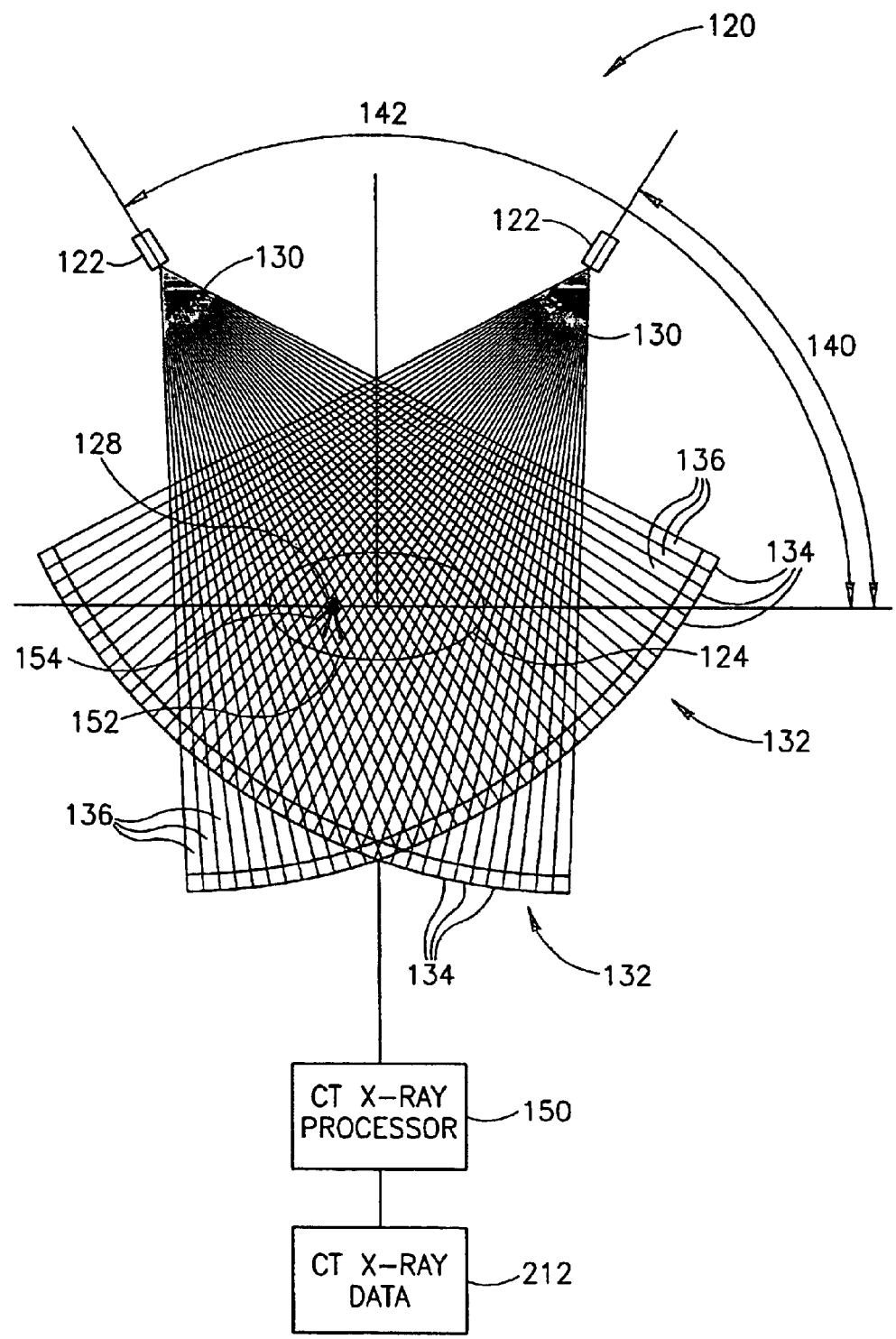
FIG. 1 is a schematic drawing of a cone beam CT system imaging biologic tissue.

FIG. 1 shows part of a CT scanner system 120 wherein an X-ray source 122 irradiates an object 124. In an exemplary embodiment of the invention, X-ray 122 produces a cone beam that is detected by an X-ray detector 132 after passing through object 124. Second, third or fourth generation CT systems can be used in the invention.

In an exemplary embodiment, X-ray detector 132 has a large number of X-ray beam collection points 134 that receive X-ray beams 136 from cone beam 130. Each beam 136 of X-ray 130 attenuates as it passes through object 124 so that there is a variation in each X-ray beam 136 that strikes each collection point, 134.

Ideally, object 124 is irradiated from many angles in a given plane, to comply with the Radon theorem that assumes a complete set of data in a single plane.

In an exemplary embodiment, X-ray scanner 120 and detector 132 generate an inconsistent data set 212 for most of the reconstructed volume. Such art inconsistent data set 212 for most of the reconstructed volume can be generated using a cone-beam CT X-ray. However the present invention may, under some circumstances be applied in reconstruction utilizing inconsistent sets of data acquired by other means.

In an exemplary embodiment, object 124 is a biologic tissue. Biologic tissue 124 typically contains soft tissue 152, composed of muscle, skin and/or organ tissue. Soft tissue 152 typically exhibits a low attenuation of X-ray beams 136 that pass through object 124.

In an exemplary embodiment, object 124 contains a high attenuation object, 128 that gives high CT numbers. High attenuation object 128 can be a bone. Alternatively or additionally high attenuation object 128 can be a metal insert such as a tooth filling, permanent metal hardware, prosthetic implant or temporary wire that holds tissue in apposition during healing. High attenuation object 128, in the presence of low attenuation soft tissue 152, typically causes artifacts 154.

Beams 136 that are collected at collection points 134, are sent to the CT X-ray processor 150 where they are transformed into CT X-ray data 212.

Figure 2:
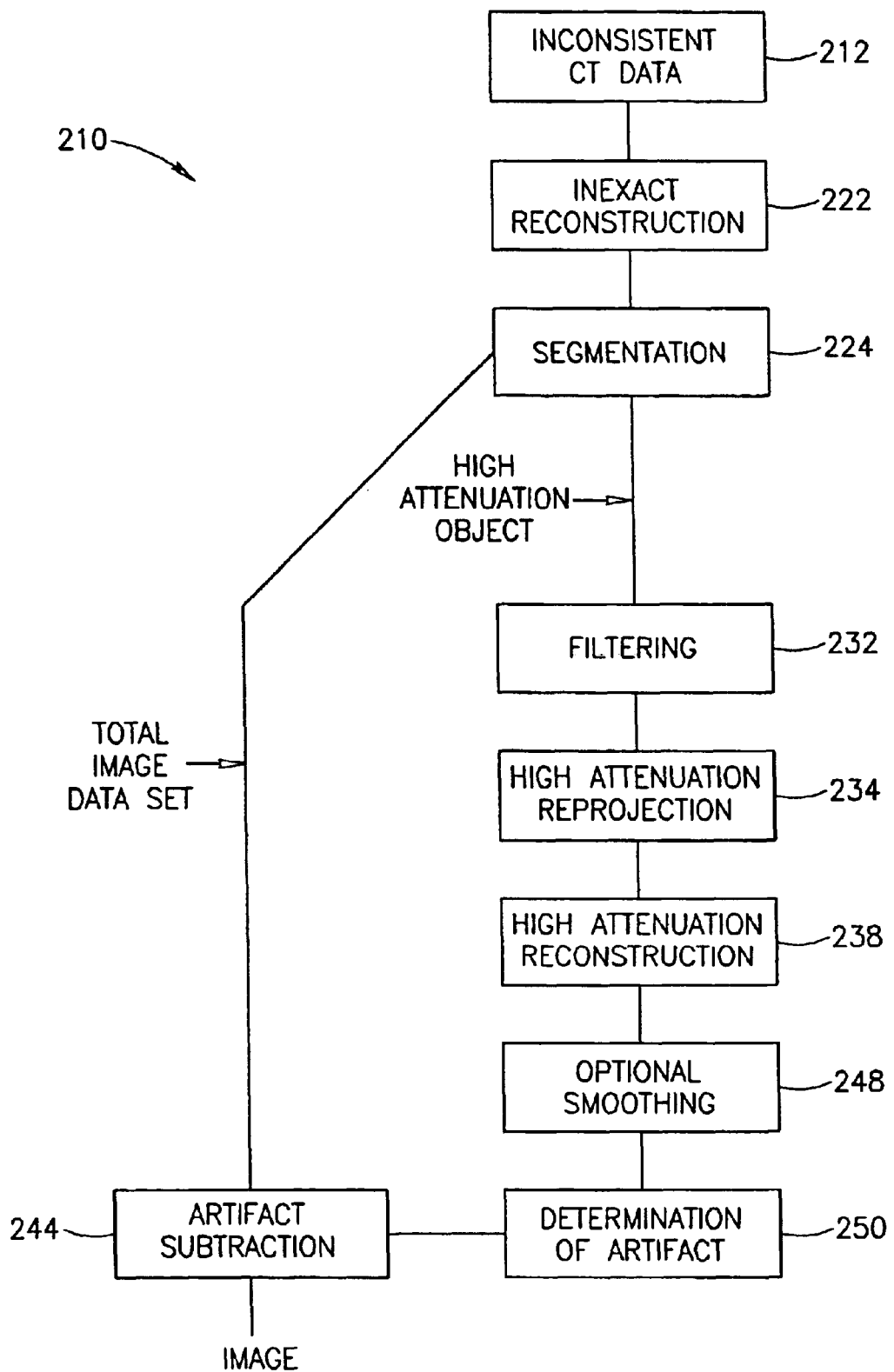
FIG. 2 is a block diagram showing a system used to reduce artifacts in a cone beam CT in accordance with an exemplary embodiment of the invention.

FIG. 2 is a block diagram showing a CT X-ray imaging reconstruction method 210 according to an exemplary embodiment of the present invention, used to process inconsistent CT data 212 from X-ray CT scanner 120 and remove artifacts 154 in the image.

Inconsistent CT data 212, such as cone beam data, for example, is reconstructed (222), a process where CT X-ray data is processed so that it can be viewed as an image. Typically, reconstruction 222 creates many images of object 124, each image recording an X-ray slice taken through a single plane passing through object 124 from the cone beam data. At least some of the images are reconstructed utilizing inexact reconstruction algorithms.

The inexact reconstruction system 222 reconstructs inconsistent CT data 212 using algorithms that are appropriate for inconsistent data from detector 132. This produces inconsistent reconstructed data that that is segmented (224). Alternatively or additionally, the inexact reconstruction system 222 is used to reconstruct data volume for which consistent data is available, instead of inconsistent CT data 212.

Segmentation refers to a process where the volume is separated into high attenuation and low attenuation regions. An exemplary method for accomplishing this separation is to use a certain threshold on the value of each pixel.

Additional or alternative parameters for object identification may be through gradient identification. Additional or alternative parameters for object identification may be through continuity reconstruction. Other methods known in the art that yield identified high attenuation regions that are separate from the image may be used.

The segmented data set has separate areas identified as the high attenuation objects. These high attenuation objects are separated from the image. The resultant high attenuation object image is filtered (232) to remove any high frequency degradation that has occurred during processing. The high attenuation object is reprojected (234). Reprojection 234 uses the same, or similar, inexact reconstruction methods as inexact reconstruction 222. In an exemplary embodiment of the present invention, the reprojection is accomplished by 3D cone beam reprojection, simulating the real direction of the original X-rays in the scanned biologic tissue 124. The result is an approximation of the scan reading of X-ray data 212 caused by high attenuation objects.

This reprojected high attenuation data is reconstructed (238). Typically reconstruction 238 uses the same, or similar, algorithms utilized in 222 to generate an image of the high attenuation objects together with artifacts that these high attenuation objects created in the low attenuation objects through the inexact reconstruction algorithm. If available, a consistent data set can be utilized in place of inconsistent CT data set 212. Hence inexact reconstruction methods can be utilized on consistent or inconsistent CT data, the product of which is segmented 224.

Optionally, high frequency artifacts that appear in the reconstructed image of the high attenuation objects are reduced for example by optional smoothing (248). The artifact portion of the reconstructed image, whether smoothed or not, is determined (250). Artifacts so determined are subtracted 244 from the data set, generated by segmentation 224 of the consistent data set containing segmented high attenuation objects and low attenuation objects, whether such segmented data set is generated from consistent or inconsistent data. The effects of the high attenuation objects are subtracted from the regions that were previously identified as containing low attenuation objects. This generates an image with reduced artifacts.

The present invention has been described using non-limiting detailed descriptions of embodiments thereof that are provided by way of example and are not intended to limit the scope of the invention. Variations of embodiments described will occur to persons of the art. In addition, while embodiments of the invention have been described as having certain groups of features, some embodiments of the invention may include fewer of more of the features or other combinations of features. Furthermore, the terms "comprise," "include," and "have" or their conjugates shall mean: "including but not necessarily limited to." The scope of the invention is limited only by the following claims.

What is claimed is:

1. A method for artifact reduction in CT images comprising:

providing at least one first set of CT data;

reconstructing at least one first data image using an inexact reconstruction algorithm;

segmenting the at least one first data image to provide at least a second image with high attenuation objects separate from low attenuation objects;

reprojecting the second image to form at least one second set of data;

reconstructing a third image from the second data set using an inexact reconstruction algorithm; and subtracting at least those portions of the third image outside the high attenuation object from the first image.

2. A method for artifact reduction in CT images according to claim 1 wherein the at least one first set of CT data is inconsistent.

3. A method for artifact reduction in CT images according to claim 2 wherein the second image is reprojected to form at least one second set of inconsistent data.

4. A method for artifact reduction in CT images according to claim 1 wherein the at least one first set of CT data is consistent.

5. A method for artifact reduction in CT images according to claim 4 wherein the second image is reprojected to form at least one second set of consistent data.

6. A method for artifact reduction in CT images according to claim 1 wherein the at least one first set of CT data is produced by a cone beam X-ray unit.

7. A method for artifact reduction in CT images according to claim 6 wherein reconstructing a third image from the second data set comprises utilizing an inexact reconstruction algorithm compatible with cone beam X-ray data.

8. A method for artifact reduction in CT images according to claim 6 wherein reconstruction of the one first data image comprises utilizing an inexact reconstruction algorithm compatible with cone beam X-ray data.

9. A method for artifact reduction in CT images according to claim 1 wherein segmenting the at least one first data image comprises segmenting to provide at least a second image with high attenuation objects.

10. A method for artifact reduction in CT images according to claim 1 wherein reprojecting the second image to form at least one second set of data comprises reprojecting along the directions of the original X-rays through the object.

11. A method for artifact reduction in CT images according to claim 1 wherein reconstructing a third image from the second data set comprises utilizing an inexact reconstruction algorithm used in reconstruction of data.

12. A method for artifact reduction in CT images according to claim 1 wherein subtracting at least those portions of the third image comprises subtracting only those portions corresponding to the low attenuation areas of the first image.

* * * * *